United States Patent
Cobb et al.

(10) Patent No.: US 10,203,192 B2
(45) Date of Patent: Feb. 12, 2019

(54) CMM WITH OBJECT LOCATION LOGIC

(71) Applicant: Hexagon Metrology, Inc., North Kingstown, RI (US)

(72) Inventors: Zachary Cobb, Newport, RI (US); Milan Kocic, Pawtucket, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 307 days.

(21) Appl. No.: 15/166,877

(22) Filed: May 27, 2016

(65) Prior Publication Data

US 2016/0349034 A1    Dec. 1, 2016

Related U.S. Application Data

(60) Provisional application No. 62/168,457, filed on May 29, 2015.

(51) Int. Cl.
*G01B 11/00* (2006.01)
*G01B 5/008* (2006.01)
*G01B 21/04* (2006.01)

(52) U.S. Cl.
CPC ............ *G01B 5/008* (2013.01); *G01B 11/005* (2013.01); *G01B 21/047* (2013.01); *G05B 2219/37193* (2013.01)

(58) Field of Classification Search
CPC .. G01B 11/005; G01B 11/007; G01B 21/047; G01B 5/008; G01B 21/04; G01B 5/012; G01B 21/045; G01B 5/0014
USPC ............................................................ 33/503
See application file for complete search history.

(56) References Cited

U.S. PATENT DOCUMENTS

| | | | |
|---|---|---|---|
| 4,276,698 A | 7/1981 | Dore et al. | |
| 4,628,441 A | 12/1986 | Johnstone et al. | |
| 4,651,426 A | 3/1987 | Band et al. | |
| 4,928,396 A | 5/1990 | Raleigh | |
| 4,949,469 A * | 8/1990 | Wachtler | G01B 5/0014 |
| | | | 33/555.1 |
| 4,958,438 A | 9/1990 | Hemmelgarn | |
| 4,964,221 A | 10/1990 | Breyer et al. | |
| 5,134,782 A | 8/1992 | Breyer et al. | |
| 5,251,156 A | 10/1993 | Heier et al. | |
| 5,471,406 A | 11/1995 | Breyer et al. | |

(Continued)

FOREIGN PATENT DOCUMENTS

CN     101000499 A    7/2007
CN     202133387 U    2/2012
(Continued)

OTHER PUBLICATIONS

Aberlink, "CMM Temperature Compensation," 2 pages, retrieved Oct. 8, 2015 from https://www.aberlink.com/products/cmm-accessories/temperature-compensation/.

(Continued)

*Primary Examiner* — Yaritza Guadalupe
(74) *Attorney, Agent, or Firm* — Nutter McClennen & Fish LLP

(57) ABSTRACT

A method and apparatus for measuring an object using a coordinate measuring machine locates the object using logic associated with the coordinate measurement machine. In response to locating the object, a controller directs a measuring device of the coordinate measuring machine to measure the object.

20 Claims, 6 Drawing Sheets

(56) References Cited

U.S. PATENT DOCUMENTS

| | | | |
|---|---|---|---|
| 5,724,264 A * | 3/1998 | Rosenberg | B25J 9/1692 700/161 |
| 5,778,549 A | 7/1998 | Campanile | |
| 5,867,916 A | 2/1999 | Matzkovits | |
| 5,953,687 A * | 9/1999 | Zink | G01B 21/04 33/503 |
| 6,134,506 A * | 10/2000 | Rosenberg | B25J 9/1692 33/502 |
| 6,449,581 B1 | 9/2002 | Ruck | |
| 6,486,963 B1 | 11/2002 | Holec | |
| 6,633,256 B2 | 10/2003 | Zhdanov et al. | |
| 6,919,658 B2 | 7/2005 | Kaczynski | |
| 7,319,909 B2 | 1/2008 | Ishikawa | |
| 7,576,847 B2 | 8/2009 | Bridges | |
| 7,779,553 B2 | 8/2010 | Jordil et al. | |
| 8,001,697 B2 | 8/2011 | Danielson et al. | |
| 8,001,859 B2 | 8/2011 | McMurtry et al. | |
| 8,006,398 B2 | 8/2011 | McFarland et al. | |
| 8,056,434 B2 | 11/2011 | Ehrenberg | |
| 8,103,153 B2 | 1/2012 | Uhl et al. | |
| 8,191,274 B2 | 6/2012 | Eaton | |
| 8,229,694 B2 | 7/2012 | Nakagawa et al. | |
| 8,352,212 B2 | 1/2013 | Fetter et al. | |
| 8,537,372 B2 | 9/2013 | Pettersson et al. | |
| 8,638,984 B2 | 1/2014 | Roithmeir | |
| 8,820,623 B2 | 9/2014 | Mayer et al. | |
| 9,046,360 B2 | 6/2015 | Atwell et al. | |
| 9,057,599 B2 | 6/2015 | Mariller et al. | |
| 9,074,620 B2 | 7/2015 | Duportal et al. | |
| 9,075,025 B2 | 7/2015 | Bridges | |
| 9,086,262 B2 | 7/2015 | Pettersson et al. | |
| 2005/0256611 A1 | 11/2005 | Pretlove et al. | |
| 2006/0266100 A1 | 11/2006 | McMurtry et al. | |
| 2008/0163054 A1 | 7/2008 | Pieper et al. | |
| 2009/0025244 A1 * | 1/2009 | Jonas | G01B 5/0014 33/559 |
| 2009/0055024 A1 | 2/2009 | Kay | |
| 2010/0036393 A1 | 2/2010 | Unsworth | |
| 2010/0299945 A1 | 12/2010 | Lacy | |
| 2012/0057174 A1 | 3/2012 | Briggs | |
| 2012/0060384 A1 | 3/2012 | Grözinger et al. | |
| 2013/0145848 A1 * | 6/2013 | Jun | G01N 29/14 73/587 |
| 2014/0211191 A1 | 7/2014 | Jensen et al. | |
| 2014/0222373 A1 | 8/2014 | Sprenger | |
| 2014/0249772 A1 | 9/2014 | Sprenger | |
| 2014/0368832 A1 | 12/2014 | Salvadé et al. | |
| 2015/0025845 A1 | 1/2015 | Mansfield | |
| 2015/0049186 A1 * | 2/2015 | Pettersson | G01B 21/047 348/135 |
| 2015/0159993 A1 * | 6/2015 | Kocic | G01B 11/005 356/51 |
| 2015/0205277 A1 | 7/2015 | Igasaki | |
| 2015/0219452 A1 | 8/2015 | Bridges et al. | |
| 2015/0226539 A1 | 8/2015 | Roeth et al. | |
| 2015/0253125 A1 | 9/2015 | Pettersson | |
| 2015/0260499 A1 | 9/2015 | Raiteri | |
| 2016/0102975 A1 * | 4/2016 | McCloskey | G01B 21/02 702/97 |
| 2016/0334201 A1 * | 11/2016 | Witkos | G01B 21/045 |
| 2016/0349034 A1 * | 12/2016 | Cobb | G01B 5/008 |

FOREIGN PATENT DOCUMENTS

| | | |
|---|---|---|
| CN | 204027541 U | 12/2014 |
| DE | 19930087 A1 | 1/2001 |
| DE | 10324833 B3 | 6/2005 |
| DE | 10 2010 014 423 A1 | 6/2011 |
| EP | 2312262 A2 | 4/2011 |
| EP | 2 788 714 B1 | 7/2015 |
| JP | 03105398 B2 | 10/2000 |
| JP | 2004-093190 | 3/2004 |
| JP | 4047096 B2 | 2/2008 |
| JP | 04280456 B2 | 6/2009 |
| JP | 2009-192401 A | 8/2009 |
| JP | 5686578 B2 | 3/2015 |
| WO | WO 2009/127526 A1 | 10/2009 |
| WO | WO 2009/129916 A1 | 10/2009 |
| WO | WO 2011/131479 A1 | 10/2011 |
| WO | WO 2014/128299 A1 | 8/2014 |

OTHER PUBLICATIONS

Aberlink, "CMM First Line Maintenance," 5 pages; Publication date unknown.

Breuer, "Entwicklung einer prototypischen Gestenerkennung in Echtzeit unter Verwendung einer IR-Tiefenkamera," Institut für Computervisualistik, 70 pages, Dec. 2005.

Engineering 360, "Coordinate Measuring Machines (CMM) Information," 3 pages, retrieved Oct. 8, 2015 from http://www.globalspec.com/learnmore/manufacturing_process_equipment/inspection_tools.

Faro, "Measuring arm FAROArm—Overview—Portable Measuring Solutions from FARO," 2 pages, retrieved Oct. 8, 2015, from http://www.faro.com/en-us/products/metrology/measuring-arm-faroarm/overview.

Faro, "FARO Laser Tracker—Overview—Laser Tracking Solutions," 2 pages, retrieved Oct. 8, 2015 from http://www.faro.com/en-us/products/metrology/faro-laser-tracker/overview.

Foix et al., "Exploitation of Time-of-Flight (ToF) Cameras," IRI Technical Report, IRI, 22 pages, 2007.

Foix et al., "Lock-in Time-of-Flight (ToF) Cameras: A Survey," OEEE Sensors Journal, vol. 11, No. 3, pp. 1-11, Mar. 2011.

Hexagon, "Whitepaper: Modern CMM Design Concepts," 5 pages, retrieved Oct. 8, 2015 from http://www.hexagonmetrology.us/applications/2011-09-16-14-41-07/299-whitepaper-mod.

Iba, et al., "An Architecture for Gesture-Based Control of Mobil Robots," Carnegie Mellon University, Research Showcase at CMU, 7 pages, 1999.

Kilic et al., "Analysis and estimation of motion transmission errors of a timing belt drive," Turk J Elec Eng & Comp Sci, vol. 18, No. 5, 2010.

Morey, Bruce, "Measuring with Light and Sight," Manufacturing Engineering, 4 pages, May 1, 2008.

Sato et al., "A Human-Robot Interface Using an Interactive Hand Pointer that Projects a Mark in the Real Work Space," Robotics and Automation, 2000. Proceedings. ICRA '00. IEEE International Conference, pp. 589-595, 2000.

Subramanian et al., "Integrating a Vision System with a Coordinate Measuring Machine to Automate the Datum Alignment Process," Proceedings of ASME2005, International Design Engineering Technical Conferences & Computers and Information in Engineering, pp. 1-7, Sep. 24-28, 2005.

International Searching Authority, ISR and Written Opinion, pertaining to International Application No. PCT/US2016/034655, 17 pages, dated Aug. 5, 2016.

* cited by examiner

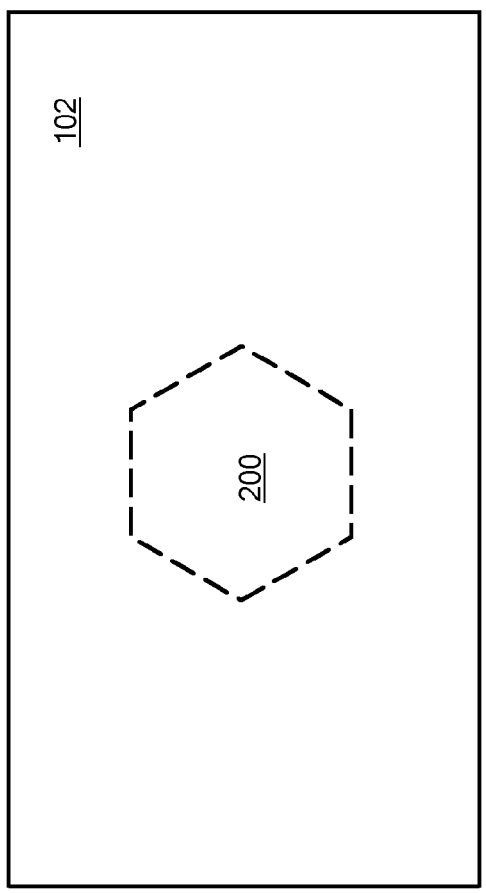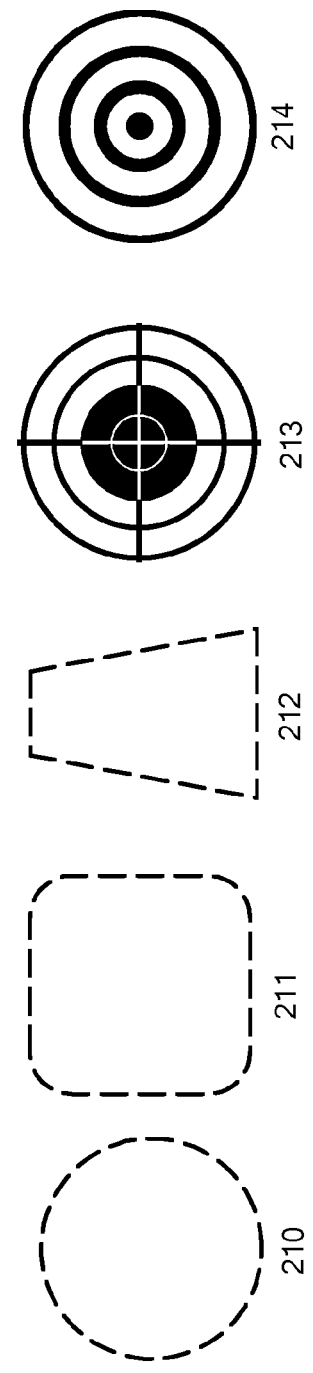
FIG. 2A
FIG. 2B

CMM WITH OBJECT LOCATION LOGIC

CROSS-REFERENCE TO RELATED APPLICATIONS

This patent application claims priority from provisional U.S. patent application No. 62/168,457, filed May 29, 2015, entitled, "CMM with Object Location Logic," and naming Zachary Cobb and Milan Kocic as inventors [practitioner's file 3740A/1033], the disclosure of which is incorporated herein, in its entirety, by reference.

TECHNICAL FIELD

The present invention generally relates to coordinate measuring machines and, more particularly, the invention relates to simplifying the measurement processes of coordinate measuring machines.

BACKGROUND ART

Coordinate measuring machines (CMMs) are the gold standard for accurately measuring a wide variety of different types of work pieces/objects. For example, CMMs can measure critical dimensions of aircraft engine components, surgical tools, and gun barrels. Precise and accurate measurements help ensure that their underlying systems, such as an aircraft in the case of aircraft components, operate as specified.

In use, an operator typically manually positions an object on a surface for measurement by the CMM. For example, that surface may be a stone base of the CMM itself. Next, the operator appropriately positions a measurement arm of the CMM to the object to begin the measurement process. Undesirably, if the operator does not appropriately position the measurement arm, then the measurement may be flawed.

SUMMARY OF THE EMBODIMENTS

In accordance with one embodiment, a method of measuring an object using a coordinate measuring machine having a measuring device to measure the object includes: projecting temporary indicia relative to the measuring device, the indicia forming a prescribed region; positioning the object within the prescribed region of the temporary indicia; after positioning the object, locating the object using object location logic associated with the coordinate measurement machine; and in response to locating the object, directing the measuring device of the coordinate measuring machine to measure the object.

The projected temporary indicia may take a variety of shapes. For example, in some embodiments, the temporary indicia has a hexagon shape. In some embodiments, the object has a surface with an object shape, and the prescribed is region of the temporary indicia has a target shape that corresponds to the object shape of the object's surface, such that positioning the object within the prescribed region of the temporary indicia includes positioning the object surface within the prescribed region of the temporary indicia. Positioning the object within the prescribed region of the temporary indicia may be done manually in some embodiments, and may be done robotically in other embodiments.

In various embodiments, the object location logic may include a locator camera, and locating the object using object location logic includes using the locator camera. In some embodiments, the object location logic includes a thermal sensor, and locating the object using object location logic includes using the thermal sensor; or the object location logic may include an acoustic sensor, and locating the object using object location logic includes using the acoustic sensor.

In various embodiments, the measuring device includes a non-contact probe, and in some embodiments the measuring device includes measuring camera. In embodiments having a locator camera, the measuring camera may be distinct from the locator camera.

In some embodiments, the coordinate measuring machine includes a platform surface for supporting the object during measurement, and the step of projecting temporary indicia relative to the measuring device includes projecting temporary indicia onto the platform surface, the indicia forming the prescribed region on the platform surface.

In some embodiments, the step of directing a measuring device of the coordinate measuring machine to measure the object includes automatically measuring the object. To that end, in some embodiments the coordinate measuring machine includes a controller directing the measuring device of the coordinate measuring machine to measure the object.

Another embodiment includes a coordinate measuring machine for measuring a work-piece (i.e., an object to be measured), and includes: a measuring sensor configured to measure a work-piece; a projector configured to project a temporary indicia, the temporary indicia forming a prescribed region on a portion of the coordinate measuring machine; an object location camera having a field of view, the object location camera disposed such that the temporary indicia, and at least a portion of a work-piece positioned within the prescribed region of the temporary indicia, are within the camera's field of view; and a controller operatively coupled to the object location camera and the measuring apparatus, the controller operating the measuring sensor to measure the work-piece after the work-piece is located by the object location camera. In some embodiments, the measuring sensor is a measuring camera, and the measuring camera distinct from the object location camera.

In some embodiments, the controller is configured identify the work-piece using the object location camera prior to operating the measuring sensor to measure the work-piece. Further in some embodiments, the controller retrieves, from a memory, a pathway for operating the measuring sensor, the pathway determined as a function of identifying the work-piece.

In some embodiments, the coordinate measuring machine includes a platform surface for supporting the work-piece during measurement, and the projector is disposed to project the temporary indicia onto the platform surface. Further, in some embodiments, the temporary indicia forms a prescribed region on the platform surface, and the prescribed region is shaped to match at least one feature of the work-piece.

In another embodiment, a coordinate measuring machine includes a measuring device for measuring an object; a projector for projecting a temporary indicia onto a portion of the coordinate measuring machine, the temporary indicia forming a prescribed region on a portion of the coordinate measuring machine; and object location logic for locating the object; and a controller for operating the measuring device to measure the object after the object is located by the object location logic. In some embodiments, the coordinate measuring machine includes a platform surface for supporting the object during measurement, and wherein the projector is disposed to project the temporary indicia onto the platform surface. Some embodiments include one or more cameras. For example, in some embodiments, the object location logic includes a camera. In some embodiments, the measuring device includes a measuring camera, which measuring camera is distinct from the object location logic.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2A schematically shows a plan view of the base of the coordinate measuring machine and an embodiment of a projection on the base;

FIG. 2B schematically shows embodiments of indicia;

DETAILED DESCRIPTION OF SPECIFIC EMBODIMENTS

Figure 1A:
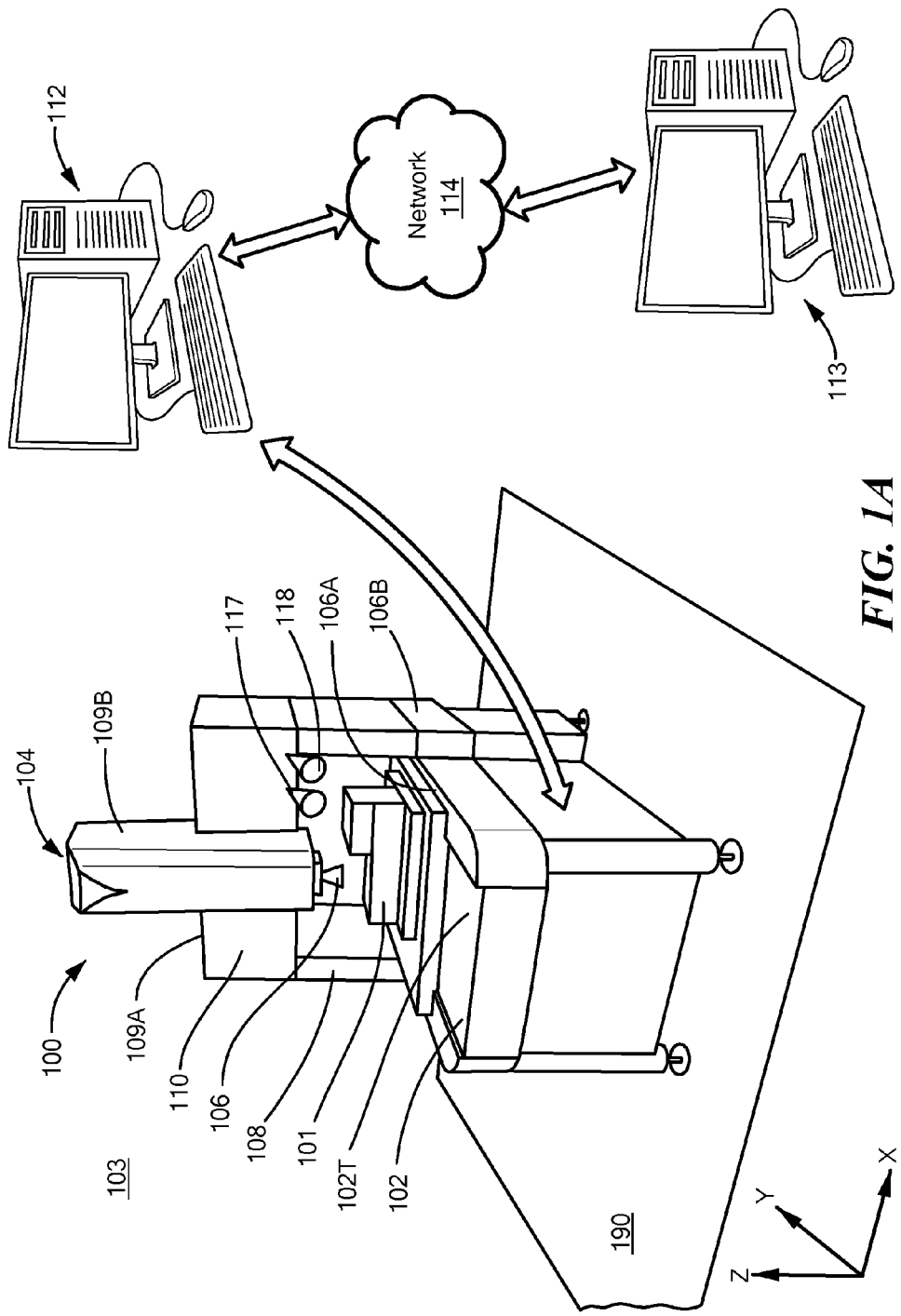
FIG. 1A schematically shows an embodiment of a coordinate measuring machine that may be configured in accordance with illustrative embodiments of the invention.

In illustrative embodiments, a coordinate measuring machine ("CMM") directs an operator to precisely position an object to be measured, and then measures the object without requiring the operator to manually align its measuring device (e.g., its movable arm carrying a tactile probe). To that end, the CMM has logic for projecting temporary indicia onto the base of the coordinate measuring machine. These indicia provide a visual cue as to the precise location for the operator to position the object. A camera or other sensor then locates the object, which preferably causes the CMM to automatically start the measurement process of a measuring program. In response to direction from the measuring program, the measuring device measures the object. Details of illustrative embodiments are discussed below.

FIG. 1 is a modified photograph of one type of coordinate measuring machine 100 ("CMM 100") that may be configured in accordance with illustrative embodiments. As known by those in the art, the CMM 100, which is within some surrounding environment 103 (e.g., a clean room or an area near an assembly line), measures an object 101 on its bed/table/base (referred to as "base 102"). Generally, the base 102 defines an X-Y plane that typically is parallel to the plane of the floor 190 supporting the CMM 100. To that end, some embodiments include a table surface (or "platform surface") 102T.

To measure the object 101 on its base 102, the CMM 100 has movable features 104 arranged to move a measuring device 106, such as a measurement head carrying any of a mechanical, tactile probe (e.g., a touch trigger or a scanning probe in a standard CMM), a non-contact probe (e.g., using laser probes), or a camera (e.g., a machine-vision CMM), coupled with a movable arm 109B. Alternately, some embodiments move the base 102 with respect to a stationary measuring device 106. Either way, the movable features 104 of the CMM 100 manipulate the relative positions of the measuring device 106 and the object 101 (or calibration artifact) with respect to one another to obtain the desired measurement. Accordingly, the CMM 100 can effectively measure the location of a variety of features of the object 101 or artifact.

Among other things, the movable features may include a plurality of rails guiding movable arms controlled by stepper motors. For example, FIG. 1 schematically shows a first rail 106A that guides a corresponding first movable structure 106B along the Y-axis of the CMM 100. As a second example, FIG. 1 also schematically shows a second rail 109A that guides a second movable structure 109B along the X-axis. In this example, the second movable structure 109B is the prior noted movable arm 109B carrying the prior noted tactile probe, noncontact probe, camera, or other measurement device.

The CMM 100 has a motion and data control system 108 ("control system 108," shown schematically in FIG. 1) that controls and coordinates its movements and activities. Among other things, the control system 108 includes computer processor hardware and the noted movable features 104. The computer processor may include a microprocessor, programmable logic, firmware, advance control, acquisition algorithms, parts programs, and analysis algorithms. As schematically illustrated in FIG. 1C, the computer processor 121 may have on-board digital memory 122 (e.g., RAM or ROM) for storing data and/or computer code, including instructions for implementing some or all of the control system operations and methods. Alternately, or in addition, the computer processor 121 may be operably coupled to other digital memory 123, such as RAM or ROM, or a programmable memory circuit for storing such computer code and/or control data.

Figure 1B:
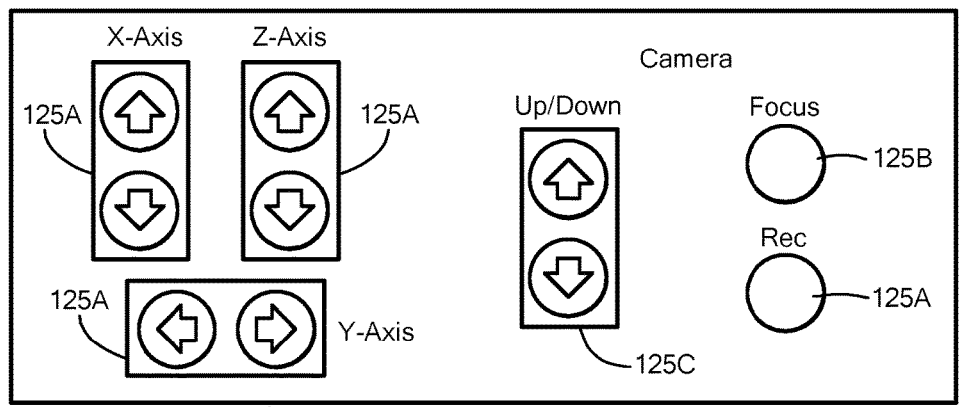
FIG. 1B schematically shows an embodiment of an operator interface for a coordinate measuring machine.
Figure 1C:
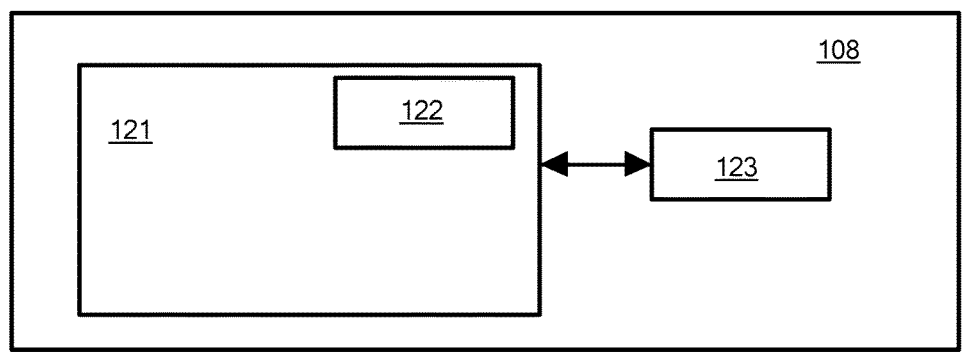
FIG. 1C schematically shows an embodiment of a controller.

Some CMMs also include a manual user interface 125 as schematically illustrated in FIG. 1B, including control buttons 125A and knobs 125B for example, to allow a user to manually operate the CMM, including changing the position of the measuring device 106 or table 102 (e.g., with respect to one another) and to record data describing the position of the measuring device 106 or table 102, and/or focusing a measurement camera on an object 101 and recording data describing the focus of the measurement camera. In a moving table CMM, the measurement camera may also be movable via control buttons 125C. As such, the movable feature 104 may respond to manual control, or under control of the controller 108, to move the table 102 and/or a location measuring device 106 (e.g., a mechanical probe in a mechanical CMM or a measurement camera in a machine vision CMM) relative to one another such that an object 101 being measured by the CMM can be presented to the measuring device 106 from a variety of angles and in a variety of positions.

Alternately, or in addition, some embodiments couple the CMM 100 with an external or integral computer 112 ("host computer 112"). In a manner similar to the control system 108, the host computer 112 has a computer processor such as those described above, and computer memory in communication with the processor of the CMM 100. The memory is configured to hold non-transient computer instructions capable of being executed by the processor, and/or to store non-transient data, such as data acquired as a result of the measurements of the object 101 on the base 102.

Among other things, the host computer 112 may be a desktop computer, a tower computer, or a laptop computer, such as those available from Dell Inc., a tablet computer, such as the iPad available from Apple Inc., or a smartphone. The host computer 112 may be coupled to the CMM 100 via a hardwired connection, such as an Ethernet cable, or via a wireless link, such as a Bluetooth link or a WiFi link. The host computer 112 may, for example, include software to control the CMM 100 during use or calibration, and/or may include software configured to process data acquired during a calibration process. In addition, the host computer 112 may include a user interface configured to allow a user to manually operate the CMM 100.

To facilitate communications, the computer 112 may be connected in some manner to a larger network 114, such as a local area network or a wide area network (not shown). For example, the network 114 in FIG. 1 may include a local area network connected to the Internet. Accordingly, the computer 112 may communicate with remote devices 113 (e.g., computers, servers, routers, etc.) via the network 114.

Illustrative embodiments configure the CMM 100 so that it can be operated with a minimum of operator intervention and skill. Specifically, prior art CMMs 100 known to the inventors require that an operator or robot manually position the object 101 on the base 102 of the CMM 100. The operator then would be required to manually move or orient the movable features 104, namely, the movable arms carrying the measuring device(s) 106, to an appropriate position for measuring the object 101. This requires some skill and can produce technical errors. Various embodiments eliminate that requirement. Instead, as discussed in greater detail below with regard to FIG. 3A, the CMM 100 has additional logic and hardware to simplify the measurement process.

Specifically, the CMM 100 also has a projector 117 for projecting temporary indicia onto the top surface (102T) of the base 102. FIG. 2 schematically shows a top view of the base 102 and an example of one type of indicia (identified by reference number 200). In this case, the indicia 200 are dashes that form a hexagon. The object 101 thus may conveniently and symmetrically fit within the hexagon—it may have a hexagonal or similar shape that fits precisely or roughly within the boundaries of the hexagon projected onto the base 200. Indeed, a hexagon is but one example of a variety of different shapes or patterns of indicia 200. As another example, as schematically illustrated in FIG. 2B, indicia 200 may form a circle 210, a bull's-eye 214, an irregular shape (e.g., 212), a rectangle 211, a grid (e.g., an X-Y Cartesian grid or radial coordinate grid 213), or other indicia that forms more than one shape. In some embodiments, where the object 101 has a known shape, or has at least one surface with a known shape (in any case, the "object shape"), the indicia 200 may have a shape that mirrors the object's shape so as to indicate the position and orientation of the object when placed on the base 102.

Figure 1D:
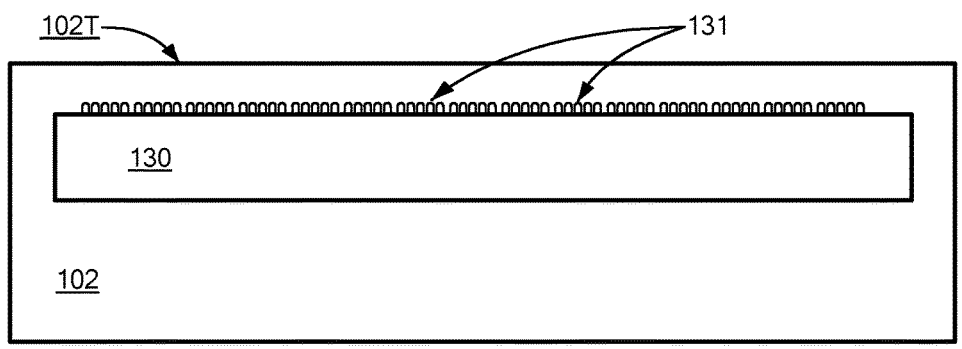
FIG. 1D schematically shows an embodiment of an illuminated base.

In some embodiments, the projector 117 may be disposed to project temporary indicia onto the top surface or "table surface" (102T) of the base 102 from below that top surface 102T, for example from within the base 102. FIG. 1D schematically illustrated an illuminator 130 (which may be considered as a type of projector 117) within the base 102. The illuminator 130 may be a LED screen or an array of lamps (131) disposed to project temporary indicia onto the top surface (102T) of the base 102 (in this embodiment, from a side of the base opposite the table surface). For example, the base 102, or at least the top surface (102T) of the base 102 may be transparent or translucent to allow light from the illuminator 130 to impinge on the top surface 102T to form and display temporary indicia 200.

The projector 117 may operate separately or in conjunction with a sensor 118 that detects the position of the object 101. Specifically, in illustrative embodiments, a camera (also referred to by reference number 118) illustratively mounted to the movable structure 104 performs a function of the sensor. This camera 118, which in some embodiments may be a thermal camera, has a different function than that of a camera (i.e., a "measurement camera") that may be used as part of the measuring device 106. Specifically, as discussed below with regard to FIG. 3A, the camera 118 (an "object location camera" or "locator camera") preferably is used primarily to locate the object 101 on the base 102. As such, the camera 118 may have a precision that is not as fine as that of the measurement camera. In some embodiments, an object location camera has a field of view, and the object location camera is disposed such that the temporary indicia, and at least a portion of a work-piece (object to be measured) positioned within the prescribed region of the temporary indicia, are within the object location camera's field of view.

Some embodiments may omit the locator camera 118 and instead, use the measurement camera used as a measuring device 106 if, in fact, the CMM 100 does have a dedicated measurement camera. For example, some embodiments may use a tactile probe and thus, not have a measurement camera as its measuring device 106. Accordingly, such embodiments may use the camera 118 to detect the position of the object 101.

It should be noted that although a camera 118 is discussed, other embodiments may use other types of sensors 118 for detecting the position of the object 101. For example, the sensor 118 may include an acoustic sensor, a thermal sensor, or other type of sensor appropriate to detect the object 101 being measured. Indeed, the type of object 101 being measured has a bearing on the type of sensor 118 that may be selected.

Figure 3A:
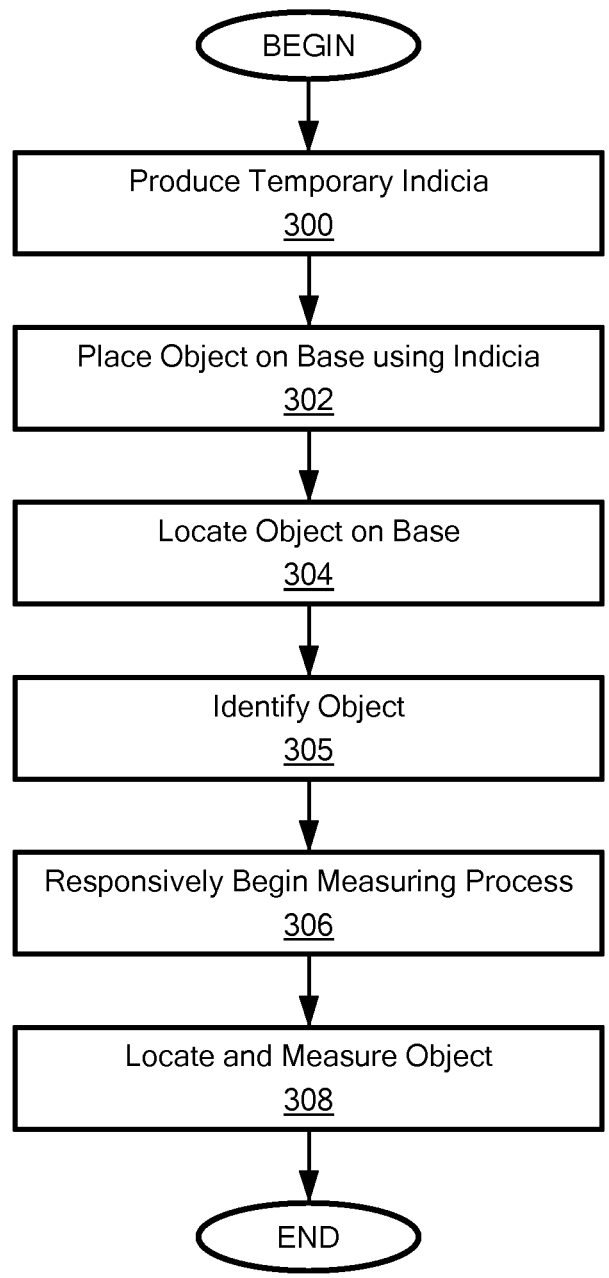
FIG. 3A shows an embodiment of a process of positioning and measuring an object on the coordinate measuring machine of FIG. 1 in accordance with illustrative embodiments of the invention.

FIG. 3A shows a process of positioning and measuring an object 101 on the coordinate measuring machine of FIG. 1 in accordance with illustrative embodiments of the invention. It should be noted that this process is substantially simplified from a longer process that normally would be used to control the drive mechanism 110 of the CMM 100. Accordingly, the process may have many steps that those skilled in the art likely would use. In addition, some of the steps may be performed in a different order than that shown, or at the same time. Those skilled in the art therefore can modify the process as appropriate.

The process begins at step 300, which projects temporary indicia 200 onto the top surface of the base 102. To that end, the projector 117 illuminates the base in a prescribed manner, such as by projecting dashes that form a hexagon 200 of FIG. 2. Next, the operator manually places the object 101 to be measured onto the base 102 using the indicia 200 as a guide (step 302). After the object 101 is positioned, the projector 117 may stop projecting the image onto the base 102. Other embodiments, however, may continue projecting the object 101 onto the base. Rather than using a human operator to place the object 101 on the base 102, some embodiments may use a robot having machine vision configured to locate the indicia 200, and accurately position the object 101 onto the base using that located indicia 200.

It should be noted that step 300 is optional. Accordingly, in that case, the operator or robot may simply place the object 101 onto the base 102 without the benefit of indicia 200 guiding placement.

After placing the object 101 onto the base 102, control logic within either or both the computer 112 or the control system 108 locates the precise position of the object 101 on the base 102 (step 304). To that end, the sensor 118 (e.g., a camera or image system; a thermal sensor; an acoustic sensor) locates the actual position of the object 101 and relays that positional information to the control logic. In some embodiments, the controller 108 receives information from the sensor 118 and uses that information to identify the object to be measured (i.e., the work-piece) prior to beginning measurement (optional step 305). Identifying the object may allow the controller 108 to assess whether the object is correctly oriented with respect to the CMM. For example, using the identity of the object 101, the controller 108 can identify (e.g., retrieve from memory 122) characteristics of the object, such as the object's shape, or a shape of a surface of the object 101, and/or a pathway for operating the measuring sensor (106) to measure the object, the pathway determined as a function of identifying the work-piece at step 305.

After locating the object 101, the control logic causes a measuring program in the control system 108 and/or computer 112 to begin executing the measurement process (step 306). Some embodiments may consider the measuring program to automatically begin executing very shortly after the control logic determines the location of the object 101. In some embodiments, the controller retrieves, e.g., from memory 122, a pathway for operating a measuring sensor (106), the pathway determined as a function of identifying the object 101.

The measurement program thus responsively moves/orients the measurement device 106 on its movable platform to the appropriate positions as required to measure the object 101 (step 308). For example, if the measuring device 106 includes a tactile probe, then the arm carrying the probe may move the probe to an initial location on the object 101 to begin the measurement process. The operator therefore is not required to move the arm and/or the measuring device 106 to the prespecified starting spot and through its measurement path. Instead, the measuring device 106 is automatically moved to the appropriate spot and progresses on its measurement path based upon the positional information from the camera 118 and nominal information it has in memory relating to the object 101 itself (e.g., a computer aided design file of the object 101).

It should be noted that because their relative positions are determined by the action of the movable features 104, the CMM 100 may be considered as having knowledge about data relating to the relative locations of the base 102, and the object 101 or artifact, with respect to its measuring device 106. More particularly, the computer 112 or other logic (e.g., the control system 108) controls and stores information about the motions of the movable features 104. Alternately, or in addition, the movable features 104 of some embodiments include position sensors that sense the locations of the table and/or measuring device 106, and report that data to the computer 112 or related logic. The information about the motions and positions of the table and/or measuring device 106 of the CMM 100 may be recorded in terms of a two-dimensional (e.g., X-Y; X-Z; Y-Z) or three-dimensional (X-Y-Z) coordinate system referenced to a point on the CMM 100.

The camera 118 and projector 117 may be considered as operating within a first coordinate system, while the CMM 100 may be considered as operating within a second coordinate system. Indeed, both coordinate systems are related and are coordinated to perform the process of FIG. 3A and/or FIG. 3B. In illustrative embodiments, however, the coordinate system of the camera 118 and projector 117, however, has a much lower precision than that of the CMM 100. This disparate coordinate system should no more than negligibly impact the effectiveness of the measurement process because the precision required to locate the object 101 (i.e., the coordinate system for the camera and projector coordinate system) typically has less stringent requirements than those to measure the object 101 (i.e., the coordinate system for the CMM 100). In other words, the camera and projector coordinate system preferably should have a precision simply to effectively place the object 101 in a general region/volume of the CMM 100. To ensure their coordination, however, prior to beginning the process of FIG. 3A and/or FIG. 3B, an operator or other process may calibrate the CMM to precisely align the two coordinate systems.

Accordingly, in illustrative embodiments, the CMM 100 automatically: 1) recognizes objects 101, 2) launches the measurement program, 3) aligns the movable measuring device 106, and 4) measures the object 101. All of these steps can be completed with a minimum amount of intervention by an operator, thus reducing the element of human error, improving accuracy and measurement throughput, and simplifying the measurement process—minimizing the need for skilled operators. An operator simply may press a "start" button or similar indicia 200 on a graphical user interface of the computer 112 or a physical button on the CMM 100 to begin the process. When the process is completed, the operator may simply remove the object 101 and repeat the process of FIG. 3A.

Figure 3B:
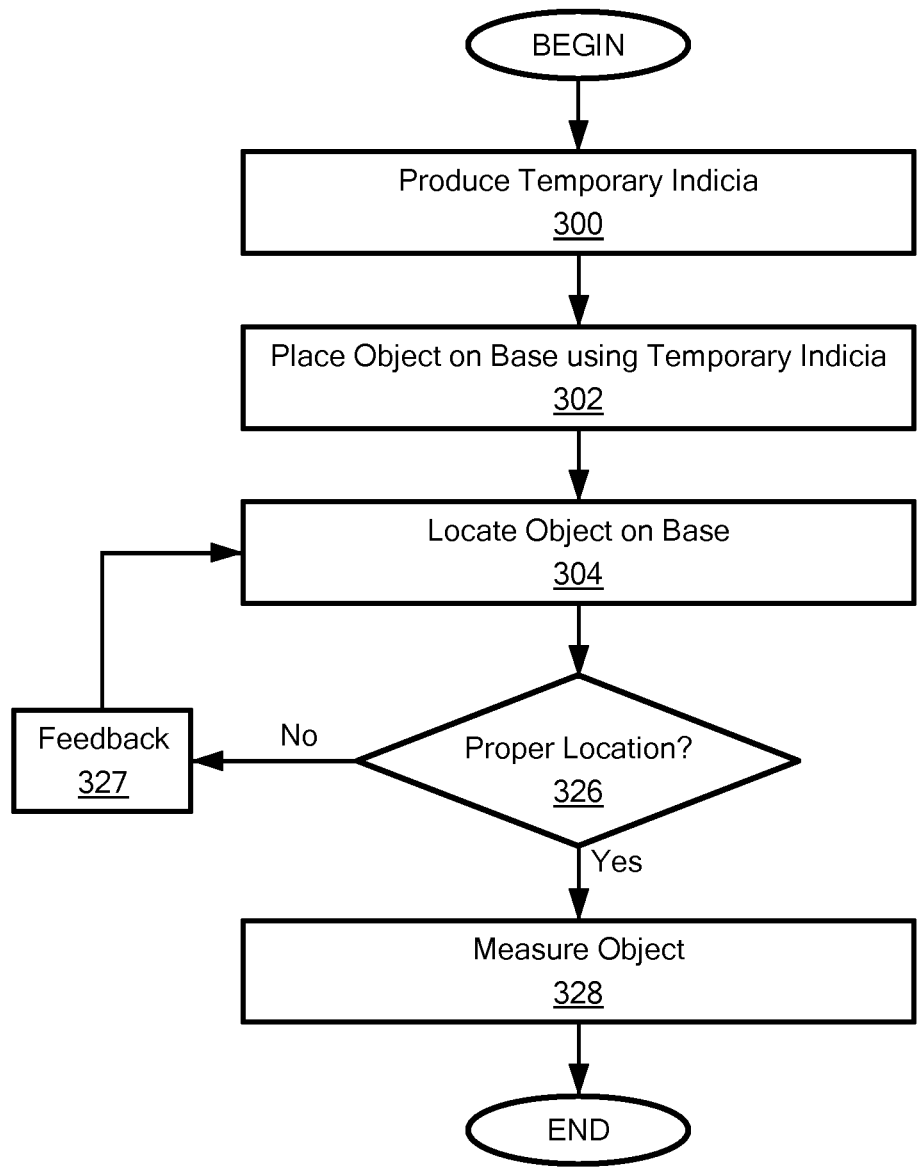
FIG. 3B shows an embodiment of a feedback process of positioning and measuring an object on the coordinate measuring machine of FIG. 1 in accordance with illustrative embodiments of the invention.

FIG. 3B is a flow chart that illustrates an alternate embodiment of a process of positioning and measuring an object 101 on the coordinate measuring machine of FIG. 1. The process of FIG. 3B begins with steps 300 (produce temporary indicia), 302 (place object on base using temporary indicia) and step 304 (locate object on base) as described above in connection with FIG. 3A.

At step 326, the process assesses whether the object is in the proper location, and/or whether the object is properly oriented at that location. An object to be measured may have a shape that requires a specific orientation, with regard to the CMM 100. For example, measurement of an object with a shape that matches indicia 212, as schematically illustrated in FIG. 2C, may indicate that the object 101 should be oriented with its narrower end (indicated by a narrower end 212N of indicia 212) facing the +Y direction.

If, at step 326, it is determined that the object 101 is properly positioned and oriented, the process proceeds to measure the object at step 328. In some embodiments, measuring the object (step 308) includes some or all of step 305, 306 and 308, described above.

Figure 2C:
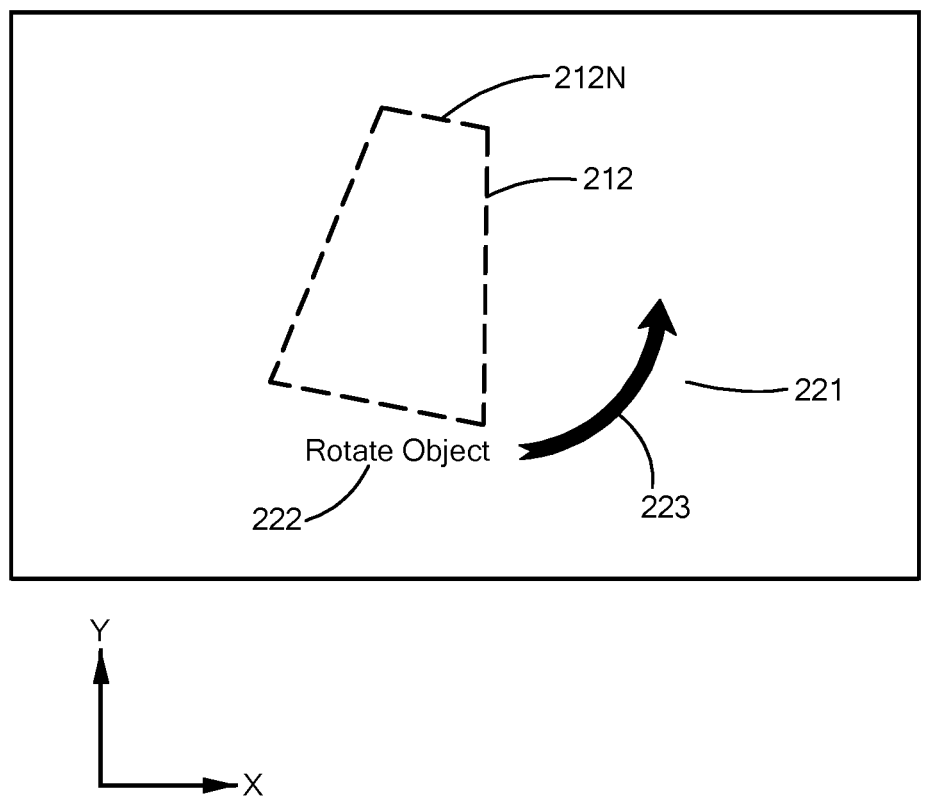
FIG. 2C schematically shows a plan view of an embodiment of the base of the coordinate measuring machine and an embodiment of a projection on the base.

However, if at step 326, it is determined that the object 101 is not properly positioned and oriented, the CMM 100 (e.g., the projector 117) may display a feedback indicia 221 on the base 102 (step 327), for example to instruct the operate or to intervene and move or re-orient the object 101, for example, as schematically illustrated in FIG. 2C. Feedback indicia 221 may include text indicia 222, for example instructing a CMM operator to move or re-orient the object 101, and/or may include graphical indicia, such as arrow 223 to show an operator how to move or re-orient the object 101. After such intervention, for example when the CMM operator has indicated that the object 101 has been moved or re-oriented, the process returns to step 304, to again assess the location and orientation of the object 101.

A listing of certain reference numbers is presented below.
100 Coordinate measuring machine
101 Object
102 Base
102T Base table, or platform surface
103 Surrounding environment
104 Moveable features
106 Measuring device
106A First rail
106B First movable structure
108 Control system
109A Second rail
109B Second movable structure (e.g. moveable arm)
110 Drive mechanism
112 Host computer
113 Remote computer
114 Network
117 Projector
118 Sensor (e.g., camera)
121 Computer processor
125 Manual user interface
125A control buttons
125B control knobs
125C Camera control buttons
200; 210-214 Embodiments of Indicia
221 Correction indicia
222 Instruction indicia
223 Graphic indicia
130 Illumination source
131 Lamps Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of measuring an object using a coordinate measuring machine having a measuring device to measure the object, the method comprising:
projecting temporary indicia relative to the measuring device, the indicia forming a prescribed region;
positioning the object within the prescribed region of the temporary indicia;
after positioning the object, locating the object using object location logic associated with the coordinate measurement machine; and
determining whether the object is properly positioned and oriented with respect to the coordinate measuring machine;
projecting feedback indicia relative to the measuring device if the object is not properly positioned and oriented with respect to the coordinate measuring machine, the feedback indicia including at least one of text feedback indicia and graphic feedback indicia to indicate to an operator to move and/or re-orient the object relative to the coordinate measuring machine.

P2. The method of P1 further including, in response to determining that is properly positioned and oriented with respect to the coordinate measuring machine, directing the measuring device of the coordinate measuring machine to measure the object.

P3. The method of P1, wherein projecting temporary indicia relative to the measuring device includes projecting temporary indicia from within the coordinate measuring machine.

P4. The method of P3, wherein the coordinate measuring machine has a table surface disposed to support the object during measurement, and wherein projecting temporary indicia relative to the measuring device includes projecting temporary indicia onto the table surface from a side of the table opposite the table surface.

P10. A coordinate measuring machine for measuring a work-piece, the coordinate measuring machine having a table surface disposed to support the object during measurement, the coordinate measuring machine comprising:
a measuring sensor configured to measure a work-piece;
a projector configured to project a temporary indicia, the temporary indicia forming a prescribed region on the table surface of the coordinate measuring machine, the projector disposed to project the temporary indicia from below the table surface; and
an object location camera having a field of view, the object location camera disposed such that the temporary indicia, and at least a portion of a work-piece positioned within the prescribed region of the temporary indicia, are within the object location camera's field of view;
a controller operatively coupled to the object location camera and the measuring apparatus, the controller operating the measuring sensor to measure the work-piece after the work-piece is located by the object location camera.

P20. A coordinate measuring machine means for measuring an object, comprising:
a sensing means for measuring the object;
a projector means for projecting a temporary indicia, the temporary indicia forming a prescribed region on a portion of the coordinate measuring machine;
an object location means for locating the object;
a controller means for operating the sensing means to measure the object after the object is located by the object location means.

P21. The coordinate measuring machine means of P20, wherein the controller means is configured identify the object using the sensing means prior to operating the sensing means to measure the object.

P22. The coordinate measuring machine means of P21, wherein the controller means retrieves, from a memory, a pathway for operating the sensing means, the pathway determined as a function of identifying the object.

P23. The coordinate measuring machine means of P20, wherein the coordinate measuring machine means includes a platform surface for supporting the object during measurement, and wherein projector means is disposed to project the temporary indicia onto the platform surface P24. The coordinate measuring machine means of P23, the temporary indicia forming a prescribed region on the platform surface, the prescribed region shaped to match at least one feature of the work-piece.

P25. The coordinate measuring machine means of P20, wherein the sensor means is a measuring camera, the measuring camera distinct from the object location means.

P30. A method of measuring an object using a coordinate measuring machine having a measuring device to measure the object, the method comprising:
projecting temporary indicia relative to the measuring device, the indicia forming a prescribed region; and
positioning the object within the prescribed region of the temporary indicia;
after positioning the object, locating the object using object location logic associated with the coordinate measurement machine; and
in response to locating the object, directing the measuring device of the coordinate measuring machine to measure the object.

P31. The method of measuring an object of P30, wherein positioning the object within the prescribed region of the temporary indicia comprises manually positioning the object.

P32. The method of measuring an object of P30, wherein positioning the object within the prescribed region of the temporary indicia comprises robotically positioning the object.

P33. The method of measuring an object of P1, wherein the measuring device comprises a non-contact probe.

P34. The method of measuring an object of P1, wherein the measuring device comprises a measuring camera.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits (ASICs), programmable gate arrays (e.g., FPGAs), and digital signal processor integrated circuits (DSPs), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium. The series of computer instructions can embody all or part of the functionality previously described herein with respect to the system. For example, embodiments may be implemented by a processor (e.g., a microprocessor integrated circuit; digital signal processor integrated circuit) executing, or controlled by, instructions stored in a memory. The memory may be random access memory (RAM), read-only memory (ROM), flash memory or any other memory, or combination thereof, suitable for storing control software or other instructions and data.

Those skilled in the art should appreciate that such computer instructions can be written in a number of programming languages for use with many computer architectures or operating systems. Furthermore, such instructions may be stored in any memory device, such as semiconductor, magnetic, flash, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of measuring an object using a coordinate measuring machine having a measuring device to measure the object, the method comprising:
projecting temporary indicia relative to the measuring device, the indicia forming a prescribed region; and
positioning the object within the prescribed region of the temporary indicia;
after positioning the object, locating the object using object location logic associated with the coordinate measurement machine; and
in response to locating the object, directing the measuring device of the coordinate measuring machine to measure the object.

2. The method of measuring an object of claim 1, wherein the coordinate measuring machine includes a platform surface for supporting the object during measurement, and wherein projecting temporary indicia relative to the measuring device comprises projecting temporary indicia onto the platform surface, the indicia forming the prescribed region on the platform surface.

3. The method of measuring an object of claim 1, wherein the object location logic comprises a locator camera, and locating the object using object location logic comprises using the locator camera.

4. The method of measuring an object of claim 1, wherein the object location logic comprises a thermal sensor, and locating the object using object location logic comprises using the thermal sensor.

5. The method of measuring an object of claim 1, wherein the object location logic comprises an acoustic sensor, and locating the object using object location logic comprises using the acoustic sensor.

6. The method of measuring an object of claim 1, wherein directing a measuring device of the coordinate measuring machine to measure the object comprises automatically measuring the object.

7. The method of measuring an object of claim 6, wherein the coordinate measuring machine comprises a controller directing the measuring device of the coordinate measuring machine to measure the object.

8. The method of measuring an object of claim 1, wherein the measuring device comprises a measuring camera and wherein the measuring camera is distinct from the object location logic.

9. The method of measuring an object of claim 1, wherein the object has a surface with an object shape, and the prescribed region of the temporary indicia has a target shape that corresponds to the object shape of the object's surface, such that positioning the object within the prescribed region of the temporary indicia comprises positioning the object surface within the prescribed region of the temporary indicia.

10. The method of measuring an object of claim 1, further comprising to identifying the object prior to beginning measurement using the object location logic.

11. A coordinate measuring machine, comprising:
a measuring device for measuring an object;
a projector for projecting a temporary indicia onto a portion of the coordinate measuring machine, the temporary indicia forming a prescribed region on a portion of the coordinate measuring machine; and
object location logic for locating the object; and
a controller for operating the measuring device to measure the object after the object is located by the object location logic.

12. The coordinate measuring machine of claim 11, wherein the coordinate measuring machine includes a platform surface for supporting the object during measurement, and wherein the projector is disposed to project the temporary indicia onto the platform surface.

13. The coordinate measuring machine of claim 11, wherein the object location logic comprises a camera.

14. The coordinate measuring machine of claim 11 wherein the measuring device comprises a measuring camera and wherein the measuring camera is distinct from the object location logic.

15. A coordinate measuring machine for measuring a work-piece, the coordinate measuring machine comprising:
a measuring sensor configured to measure a work-piece;
a projector configured to project a temporary indicia, the temporary indicia forming a prescribed region on a portion of the coordinate measuring machine; and
an object location camera having a field of view, the object location camera disposed such that the temporary indicia, and at least a portion of a work-piece positioned within the prescribed region of the temporary indicia, are within the camera's field of view;
a controller operatively coupled to the object location camera and the measuring sensor, the controller operating the measuring sensor to measure the work-piece after the work-piece is located by the object location camera.

16. The coordinate measuring machine of claim 15, wherein the controller is configured identify the work-piece using the object location camera prior to operating the measuring sensor to measure the work-piece.

17. The coordinate measuring machine of claim 16, wherein the controller retrieves, from a memory, a pathway for operating the measuring sensor, the pathway determined as a function of identifying the work-piece.

18. The coordinate measuring machine of claim 15, wherein the coordinate measuring machine includes a platform surface for supporting the work-piece during measurement, and wherein the projector is disposed to project the temporary indicia onto the platform surface.

19. The coordinate measuring machine of claim 18, the temporary indicia forming a prescribed region on the platform surface, the prescribed region shaped to match at least one feature of the work-piece.

20. The coordinate measuring machine of claim 15, wherein the measuring sensor is a measuring camera, the measuring camera distinct from the object location camera.

* * * * *